Patented Jan. 25, 1949

2,459,901

UNITED STATES PATENT OFFICE 2,459,901

PROCESS OF MAKING RHUBARB JUICE

Orin Clark Stout, Hamilton, Ohio

No Drawing. Application October 14, 1944,
Serial No. 558,749

5 Claims. (Cl. 99—105)

There have been developed juices of various vegetables and fruits which are now part of the customary diet of the people, but so far as I am advised, rhubarb has not been developed into a juice which is attractive in color and palatable and has a taste familiar to persons acquainted with cooked rhubarb.

Rhubarb is a highly acid plant and no part of the foliage may be employed since it is exceedingly rich in oxalic acid. As in preparing rhubarb for cooking, only the stems of the leaves are employed.

The first step in the process of making the juice is to grind the stems to a rather fine consistency and permit the ground up substance to stand for two to three hours. The result of this is to develop the juice from the pulp and from the skin as well, which gives flavor and in addition imparts the color of the outer skin to the juice that is developed, so that when rose colored stems are used the rosy color is imparted to the juice. If the ground up substance were at once pressed to extract the juice, this result would not obtain, nor would certain of the more delicate taste flavors be developed.

The pulped material steeped as it were in its own juice, is then pressed to extract the juices, and the juices promptly brought as near freezing temperature as possible, (about 30 degrees F.), and are permitted to stand for many hours, my practice being to permit the juices to stand for twenty-four hours. The result of this step is to clarify the juices, so that all sediment passes to the bottom of the vessel and the remaining juice is sparklingly clear.

The juice is then decanted and treated with milk of lime. The purpose of this treatment is to reduce the oxalic acid content of the juice to within palatable range, or in other words to increase the pH of the juice. The amount of increase of the pH is somewhat dependent upon the taste of the producer. According to standard practice in my operation using matured rhubarb stems as a supply, the juice at the stage now reached in the process has a pH of about 3.30 to 3.40.

To a juice of this pH I add sufficient milk of lime to bring the pH up to 3.60 to 4. Too much milk of lime tends to reduce the rosy color along with the acidity of the juice, too little or omission of the milk of lime permits too much oxalic acid to remain in the juice for the ordinary palate and digestion.

After the milk of lime is mixed well into the juice it is then permitted to settle again at refrigerated temperature of around 30 degrees F. for another twenty-four hours, during which time the precipitated oxalic acid salts settle, permitting the clear juice to be decanted.

To the decanted juice there is then added sugar, in my practice the sugar being twenty ounces per gallon of juice. This can be changed to suit the taste, but the presence of sugar is necessary due to the tartness of the juice otherwise being unpleasant.

It is then necessary to pasteurize the juice which is done in a closed retort at a temperature of around 180 to 190° F. for five minutes, after which the juice is bottled, and preferably the bottled juice is subjected to another heating in a pressure tank under fifteen pounds of steam for another five minutes.

The juice will then keep indefinitely, and all bacteria which may have gotten into the juice during processing are killed.

The juice is uncooked and has the taste of rhubarb, familiar to those who have eaten cooked rhubarb. It is mildly acid and sweet, clear in consistency and rosy. So far as I am advised no similar product has heretofore been produced.

Having thus described my invention, what I claim as new and desire to secure by Letters Patent is:

1. The process of forming an uncooked juice from rhubarb which consists in grinding the stems of the leaves, permitting the ground mass to stand for around two hours or more to develop the color and taste in the fluid portion of the mass from the outer skin of the stems, then settling out the solid matter from the juice while at the same time chilling the juice to a temperature just short of freezing, then adding milk of lime to the decanted juice from the settling stage, to increase the pH of the juice, then settling out the oxalic acid salts, maintaining the juice cold during the settling, and finally adding sugar to the juice.

2. The process of forming an uncooked juice from rhubarb which consists in grinding the stems of the leaves, permitting the ground mass to stand for around two hours or more to develop the color and taste in the fluid portion of the mass from the outer skin of the stems, then settling out the solid matter from the juice while at the same time chilling the juice to a temperature just short of freezing, then adding milk of lime to the decanted juice from the settling stage, to increase the pH of the juice, then settling out the oxalic acid salts, maintaining the juice cold during the settling, and finally adding sugar to the juice, and then heating the juice for a few minutes to pasteurize it and finally bottling the juice.

3. The process of forming an uncooked juice from rhubarb which consists in grinding the stems of the leaves, permitting the ground mass to stand for around two hours or more to develop the color and taste in the fluid portion of the mass from the outer skin of the stems, then settling out the solid matter from the juice while at the same time chilling the juice to a temperature just short of freezing, then adding milk of lime to the decanted juice from the settling stage, to increase the pH of the juice, then settling out the oxalic acid salts, maintaining the juice cold during the settling, and finally adding sugar to the juice, and then heating the juice for a few minutes to pasteurize it and finally bottling the juice, and heating the closed bottles in a pressure vessel at around 15 pounds of steam, to further kill all bacteria therein.

4. The process of forming an uncooked juice from rhubarb which consists in grinding the stems of the leaves, permitting the ground mass to stand for around two hours or more to develop the color and taste in the fluid portion of the mass from the outer skin of the stems, then settling out the solid matter from the juice while at the same time chilling the juice to a temperature just short of freezing, then adding milk of lime to the decanted juice from the settling stage, to increase the pH of the juice, then settling out the oxalic acid salts, maintaining the juice cold during the settling, and finally adding sugar to the juice, the amount of milk of lime added being sufficient to bring the pH of the juice to 3.6 to 4.

5. The process of forming an uncooked juice from rhubarb which consists in grinding the stems of the leaves, permitting the ground mass to stand for around two hours or more to develop the color and taste in the fluid portion of the mass from the outer skin of the stems, then settling out the solid matter from the juice while at the same time chilling the juice to a temperature just short of freezing, then adding milk of lime to the decanted juice from the settling stage, to increase the pH of the juice, then settling out the oxalic acid salts, maintaining the juice cold during the settling, and finally adding sugar to the juice, the settling in both instances being conducted by holding the juice for around twenty-four hours at a temperature of around 30 degrees F.

ORIN CLARK STOUT.

REFERENCES CITED

The following references are of record in the file of this patent:

UNITED STATES PATENTS

| Number | Name | Date |
|---|---|---|
| 2,199,522 | Jones | Mar. 7, 1940 |

OTHER REFERENCES

"Fruit and Vegetable Juices," by Tressler, Joslyn & Marsh published 1939 by the Avi Publishing Co., Inc., New York, pages 324 to 328.